US005268810A

United States Patent [19]

DiMarco et al.

[11] Patent Number: 5,268,810

[45] Date of Patent: Dec. 7, 1993

[54] ELECTRICAL CONNECTOR INCORPORATING EMI FILTER

[75] Inventors: Mario DiMarco, Scottsdale; Timothy J. Wilhelm, Peoria, both of Ariz.

[73] Assignee: Honeywell Inc., Minneapolis, Minn.

[21] Appl. No.: 2,297

[22] Filed: Jan. 8, 1993

[51] Int. Cl.[5] .......... H02H 9/04

[52] U.S. Cl. .......... 361/111; 333/182; 439/620

[58] Field of Search .......... 361/111, 58, 113; 333/181, 182; 439/620

[56] References Cited

U.S. PATENT DOCUMENTS

| | | | |
|---|---|---|---|
| 5,066,931 | 11/1991 | Thelissen | 333/182 |
| 5,071,369 | 12/1991 | Denlinger et al. | 439/595 |
| 5,081,434 | 1/1992 | Sakamoto et al. | 333/182 |
| 5,142,430 | 8/1992 | Anthony | 361/111 |
| 5,206,779 | 4/1993 | Sato et al. | 361/111 |

*Primary Examiner*—Todd DeBoer

*Attorney, Agent, or Firm*—C. Mersereau; D. E. Jepsen; A. Medved

[57] ABSTRACT

An electrical connector receptacle for allowing connection of electronic apparatus contained within a shielded enclosure to a multi-conductor wiring harness using a plug having a plurality of male pins arranged in a grid pattern is shown in which the connector receptacle includes a conductive connector receptacle shell defining a housing cavity having open front and rear faces dimensioned to receive the plug when inserted through the open front face. A multi-coplanar capacitor (MCC) layered structure having a front and a rear surface is connected with its front surface facing the rear surface of the connector receptacle and having a plurality of socket contacts arranged to receive the connector pins of the male plug. Separate individual pin planes define the MCC system each associated with a pair of ground planes connected to a common chassis ground. At least one RFI filter core means is disposed in front of or behind in juxtaposed relation to the MCC and having openings allowing passage of the connector terminal pins to aid in the suppression of VHF and UHF RFI. The combined structure provides a grounded RFI filter barrier, the RFI output filtering being improved with the core means located behind the MCC and the input filtering being improved with the core means disposed in front of the PWB.

8 Claims, 4 Drawing Sheets

ELECTRICAL CONNECTOR INCORPORATING EMI FILTER

BACKGROUND OF THE INVENTION

I. Cross-Reference to Related Applications

Cross reference is made to related applications Ser. No. 08/001995 to Mario DiMarco, a co-inventor in the present application, entitled "ELECTRICAL CONNECTOR INCORPORATING GROUND SHIELD SPACER" and 08/002296, to Timothy J. Wilhelm , a co-inventor in the present application, entitled "MULTI-COPLANAR CAPACITOR FOR ELECTRICAL CONNECTOR", both filed of even date and assigned to the same assignee as the present application.

II. Field of the Invention

This invention relates generally to electrical connectors for connecting electrical devices or parts to a cable harness, and more particularly to a connector assembly incorporating an input/output core filtering system to improve the isolation of the electrical assembly with which the connector is used from electromagnetic interference (EMI), radio frequency interference (RFI), and particularly HF, VHF and UHF radio frequencies.

III. Discussion of the Prior Art

Present-day commercial and military aircraft incorporate highly complex electronic control systems incorporating numerous sensors and force transducers and servo systems as well as the electronics necessary for processing the sensor signals and developing the requisite control signals for the transducers and the like so that the aircraft can be flown in a controlled manner. Typically, the electronic assemblies involved will be housed in metallic shielding enclosures or boxes which are adapted to slide into equipment racks on the aircraft. Each of the electronic modules will typically incorporate a receptacle having a large number of terminal pins arranged in a grid pattern and which are appropriately wired to the electronic componentry within the shielded enclosure. Incorporated into the rack assembly is a plug member which is adapted to mate with the receptacle on the box housing the electronics module. The pins of the plug are typically connected to conductors in a wiring harness leading off to other electronic equipment which may be spread throughout the aircraft.

One standard plug used throughout the aircraft industry is referred to as the ARINC 600 plug, which meets the ARINC specifications for air transport avionics equipment interfaces. That specification, among other things, defines the number of pins, their location, the pin spacing and the shell dimensions for the plug. Those desiring more specific information relative to the plug are referred to the ARINC 600 specification itself.

The ARINC 600 plug is designed to mate with a receptacle attached to or formed into a wall of the shielding enclosure in which the electronics are contained. The ARINC 600 plug includes three sections with sections A and B incorporating 150 male pins, each disposed in a grid array of rows and columns. Section C includes a smaller number of pins which, generally speaking, provide the power connections to the electronics module. The existing receptacle, designed to accept the plug, includes a plurality of terminal pins having female sockets on one end and male wire wrap terminals or solder points on the other end. The pins are arranged in the same grid array, such that when the plug is inserted into the receptacle, the male pins of the plug engage the female sockets of the receptacle's terminal pins. The male portion of the receptacle's terminal pins then connect to the wiring for the electronics within the shielded enclosure.

One drawback of the prior art ARINC 600 connector design is that it does not provide the necessary immunity of the electronic circuitry from the effects of EMI and more particularly filter out HF, VHF and UHF frequency ranges. EMI radiation in proximity to the module may find its way into the interior of the shielded enclosure via the connector assembly. These EMI sources may result in the electronic controls issuing erroneous data to the other electronic equipment with which it is associated, resulting in loss of control over the aircraft.

While filtering and transient suppression circuits have been devised for dealing with EMI radiation, physical space constraints may preclude inclusion of such circuitry within the electronics module. A need, therefore, exists for a connector plug receptacle assembly which has an efficient high energy ground associated with a shield or filtering device which combines an efficient shield for the EMI/RFI frequencies of interest with an excellent chassis ground.

OBJECTS

It is accordingly a principal object of the present invention to provide an improved connector receptacle assembly for an enclosure containing an improved grounded system to filter EMI frequency ranges of interest.

Another object of the invention is to provide an improved connector receptacle which can mate with an industry standard plug and which incorporates an improved grounded shield for limiting various HF, VHF and UHF electromagnetic radiation frequencies from deleteriously affecting the operation of the control electronics.

Another object of the invention is to provide an improved receptacle containing a large plurality of terminal pins which will mate with an industry standard plug and in which the EMI is effectively filtered for each pin, but where the connector receptacle will still fit in the space allocated for it on the electronics module.

A still further object of the invention is to provide a connector receptacle of the type described which combines an input/output core filter with an associated multi-coplanar capacitor (MCC) system and ground system.

SUMMARY OF THE INVENTION

The foregoing features and objects of the invention are achieved by providing an electrical connector receptacle for use with electronic apparatus contained within a shielding enclosure. While the detailed embodiment is designed to mate with an industry standard rectangular plug, it is contemplated that a plug of any shield configuration of the type having a plurality of male pins arranged in a grid of rows and columns where the male pins are electrically and mechanically joined to a multi-conductor wiring harness can be used. The connector receptacle is in the form of a conductive shell mounted in a wall of the shielding enclosure.

The shell in the rectangular or box-like embodiment has four mutually perpendicular side walls defining a housing cavity with open front and rear faces. The housing cavity is dimensioned to receive the aforementioned industry standard plug when it is inserted through the open front face of the shell. Affixed to the shell, proximate its open rear face, is a removable frame which supports a flat substrate containing a plurality of socket contacts arranged in the same grid pattern of rows and columns as is used for the male pins on the plug. The substrate also includes a plurality of terminal pins fitted into the socket contacts where the terminal pins project outwardly and rearwardly with respect to the shell and thereby provide the points which are directly connected to the wiring of a printed wiring board (PWB) type multi-coplanar capacitor electronic apparatus behind the plug enclosure.

The connector or plug receptacle of the invention includes a generally rectangular shell or housing of electrically conducting material provided with a suitable substantial chassis ground and plated where indicated to minimize corrosion during the life of the receptacle. The rear portion of the connector housing or shell is designed to be connected to a ground shield spacer module which is in the form of a frame having substantially parallel opposed major surfaces spaced by the modular thickness.

The present invention solves many of the problems associated with prior connector systems, especially with respect to enhanced VHF and UHF filter performance by the addition of ferrite core systems adjacent to an integral multi-coplanar capacitor system associated with a composite female receptacle connection system. A separate ground/shield/spacer may also be part of the system.

The multi-coplanar capacitor PWB alone will provide filtering according to its capacitance. Voltage breakdown of the PWB also varies according to the construction materials and layer thickness. The multi-coplanar capacitor is preferably constructed to be connected directly to the chassis ground as shown. A good ground is an important consideration with respect to successful operation of the filter.

According to the invention, enhanced VHF and UHF RF frequency filter performance in accordance with the present invention comes from the addition of core modules, particularly ferrite core modules, located in particular positions with respect to the MCC/PWB structure. The combination of the MCC/PWB and ferrite can be used to provide an enhanced multi-coplanar capacitance filter system for both incoming and outgoing signals.

Core material placed on the inside of the MCC/PWB will filter outgoing signals; and, conversely, core material placed in front of the MCC/PWB will filter incoming signals. By placing ferrite at both locations, both input and output signals are filtered. Of course, the invention is meant to include embodiments using but one core material layer and in either position in addition to cores in both positions.

Thus, the ferrite or core material is placed on the side of the EMI filter requiring enhanced low pass filtering. The enhanced low pass filtering corresponds to the ferrite side. The course requiring HF, VHF and UHF filtering is on the same side as the ferrite. The MCC/PWB provides low pass filtering in either direction into the micro wave region. The core material does require a low impedance so that the core material will provide the desired increased series impedance between the capacitor and ground. The idea of the combined core and capacitor configuration of the invention provides a short through the connector at low frequencies (open with respect to ground). As the frequency increases, the core increases the series impedance while the capacitor decreases toward a lower impedance. The lower impedance of the capacitor connects signals to ground, while the higher impedance of the core removes the signal from the capacitor, similar to a voltage divider circuit.

BRIEF DESCRIPTION OF THE DRAWINGS

The foregoing features, objects and advantages of the invention will become apparent to those skilled in the art from the following detailed description of a preferred embodiment especially when considered in conjunction with the accompanying representative drawings in which like numerals in the several views refer to corresponding parts.

DETAILED DESCRIPTION

Figure 1:
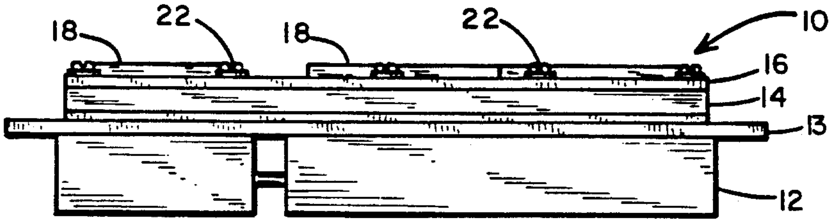
FIG. 1 is a side elevational view of one embodiment of the connector receptacle of the invention including a connected PWB.
Figure 2:
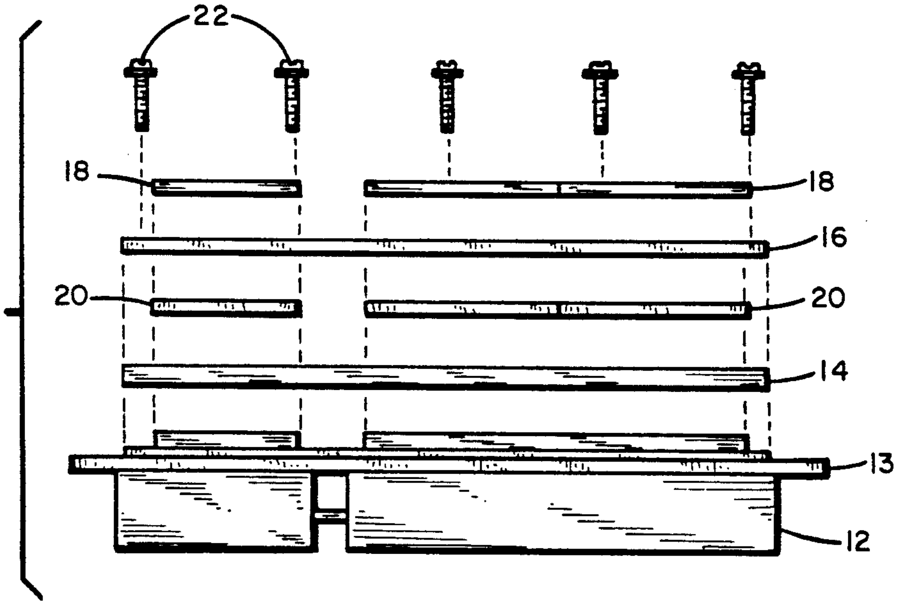
FIG. 2 is an exploded view of the electrical connector assembly in accordance with FIG. 1 of the present invention.
Figure 3:
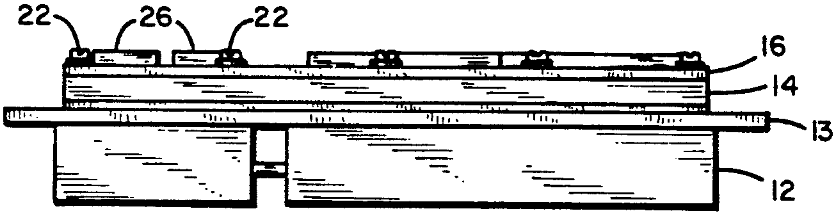
FIG. 3 is a side elevational view of another embodiment of the connector including an attached PWB.
Figure 4:
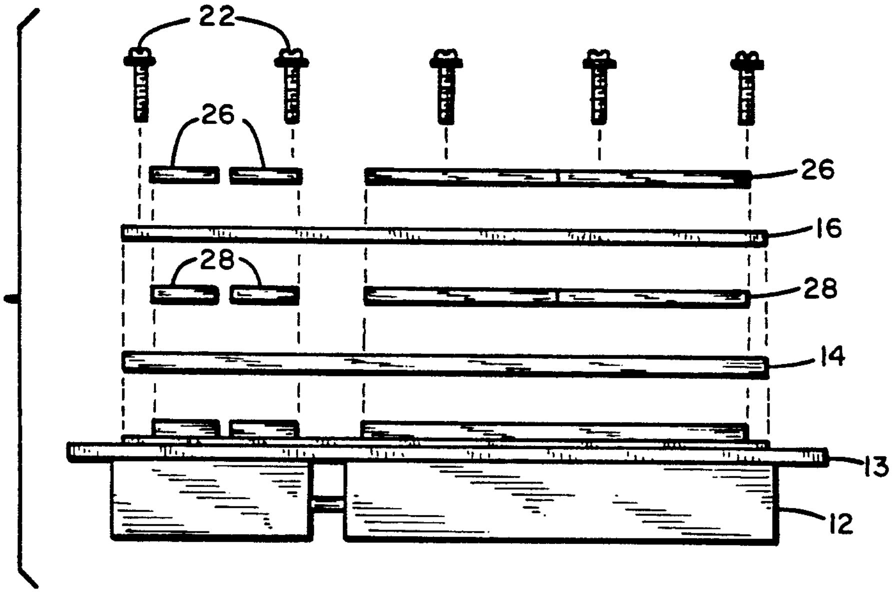
FIG. 4 is an exploded view of the electrical connector in accordance with FIG. 3.

With first reference to FIGS. 1 and 2 of the drawings, a side elevational view of a receptacle of the invention, generally at 10, is shown assembled together with an integral MCC/PWB in accordance with the invention. The assembled system includes an electrically conductive housing or shell 12 with mounting flange 13 which may be made out of any suitable material and provided with an electrically conductive surface or plating, if necessary, to minimize corrosion throughout the life of the receptacle. A combination ground shield spacer is shown at 14 and a connected multi-coplanar capacitor system in the form of a printed wire board (PWB), at 16. The PWB constructed MCC is depicted as being sandwiched between core layers (usually ferrite). The assembled system is held tightly together by an array of fasteners which may be screws as at 23. FIGS. 3 and 4 depict an embodiment similar to that of FIGS. 1 and 2 adapted to service a slightly different plug terminal pin configuration in which the ferrite core sections are labeled 26 and 28. The connector contacts or terminal pins 52 (FIG. 7A) are electrically connected to the MCC/PWB and carry signals associated with input/output devices.

The shield/spacer 14 also functions as a shield for EMI and particularly HIRF energy from the electromagnetic spectrum. This is achieved by essentially sealing the rear of the connector from the outside world by providing a very low impedance to ground path and which guarantees that there will no apertures at any point along the mating surfaces large enough for the radiation to pass through. The shield spacer module in conjunction with a connector of the class described herein is more fully described in the aforementioned cross-referenced DiMarco application Ser. No. 08/001995; and to the extent further details are needed with respect to them, such details or other descriptive material is deemed incorporated herein by reference.

While perhaps not apparent from the view of FIGS. 1 and 3, as will be appreciated by those skilled in the art, in many applications, such as in aircraft control systems, space is very much at a premium. Thus, the circuit containing modules are made as small as possible consistent with the density of the printed wiring boards and the temperature constraints imposed on the electronic circuit components. The PWB may typically slide into a rack having a male connector plug projecting from a surface thereof to mate with the receptacle 10. The plug (not shown) comprises a termination of a multi-conductor cable or wiring harness which leads to remote areas of the aircraft, ship, etc., containing the other equipment and input sensors.

As is set forth in the introductory portions of this specification, it is imperative that the electronics contained within the connected modules be rendered immune from emitting erroneous control information, via the aforementioned multi-conductor cable leading to the controlled structures due to the introduction of EMI/RFI and HIRF, etc. through the connector. Thus, it is imperative that the electronic components be isolated from radio frequency interference signal.

For the most part, the system is effectively grounded when in position in an enclosure on an equipment rack and the enclosure acts as a shield preventing EMI/RFI from penetrating and reaching the sensitive electronic components. However, if such EMI/RFI radiation are able to penetrate the enclosure via the connector, the circuitry can be impacted and caused to emit wrong information.

To obviate this possibility, it might be possible to incorporate appropriate filter circuitry and high voltage transient suppression circuitry which is operatively coupled to the conductors joining the connector 10. However, when space is at a premium, this may not be an effective solution in that there is simply not sufficient room for the required filtering and transient suppression circuitry.

In accordance with the present invention, that function is primarily assumed by the components operatively disposed within the confines of the connector receptacle MCC/PWB and ferrite core combined system. The way in which this is accomplished will next be explained.

Figure 7A:
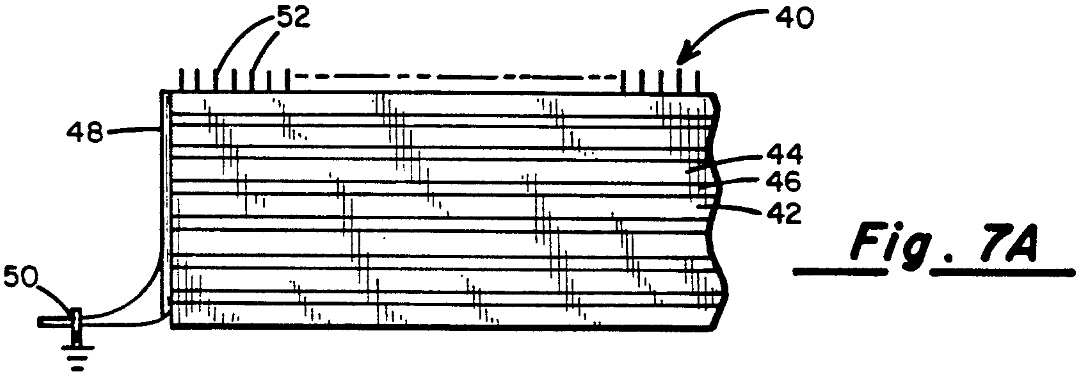
FIG. 7A is a fragmentary schematic side elevational view of a part of a PWB filter plane system.
Figure 7B:
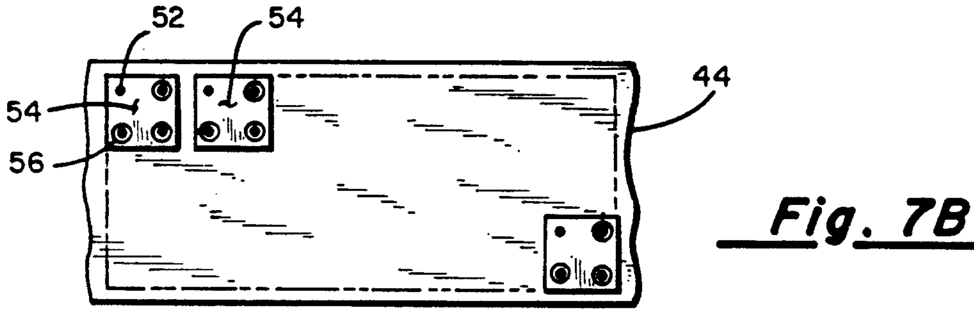
FIG. 7B is a fragmentary top schematic view of a pin plane of the multi-layered structure of FIG. 7A.
Figure 7C:
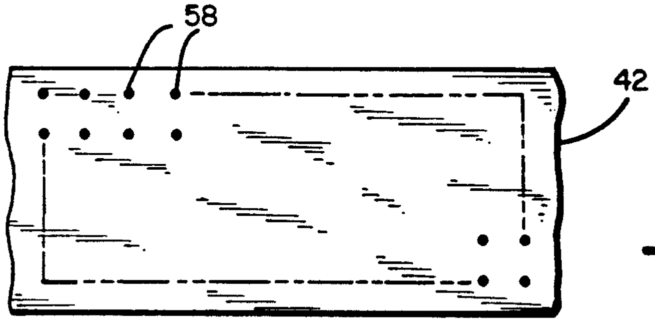
FIG. 7C is a fragmentary top schematic view of a ground plane of the multi-layered structure of FIG. 7A.

In accordance with the present invention, the multi-coplanar capacitor filtering afforded by the PWB is illustrated by FIGS. 7A-7C. FIG. 7A depicts generally at 40 a laminated series of PWB planes comprising alternating ground planes 42 and pin planes 44 separated by insulating layers 46. The ground planes are conductive metal, commonly copper, and are commonly connected as at 48 and from there to a substantial chassis ground connection as at 50. Terminal pins are illustrated at 52. Each pin plane 44 is associated with an array of separate small planes 54 spaced between ground planes and each connected to a single terminal pin 52, the other pins as at 56 encompassed by each of the small planes are not connected to that plane but pass through clearance holes to another such small plane, possibly associated with the next pin plane. As shown in FIG. 7C, the ground planes 42 are solid except for openings 58 to accommodate the pins 52.

The planes 54 provide capacitance and act as filters with respect to high frequency EMI. The filter frequency range, of course, will vary according to the thickness and pin plate configuration and dielectric separation layers 46, etc., in a well-known manner.

In other words, the PWB multi-coplanar capacitor alone will provide filtering according to its capacitance. Voltage breakdown of the PWB will also vary according to the construction materials and layer thickness. The multi-coplanar capacitor is preferably constructed to be connected directly to the chassis ground as shown. A good ground is an important consideration with respect to successful operation of the filter. Additional details with respect to the MCC/PWB are contained in the above cross-referenced application to Wilhelm, Ser. No. 08/002296, and to the extent necessary may be deemed to be fully incorporated herein by reference.

Enhanced VHF and UHF RF frequency filter performance in accordance with the present invention comes from the addition of core modules in particular positions with respect to the combined structure. The combination of the multi-coplanar capacitor of the MCC/PWB and core material can be used to provide an enhanced multi-coplanar capacitance filter system for both incoming and outgoing signals.

The embodiments of FIGS. 1-4 depict cores at both positions 18 and 20, or 26 and 28, i.e., flanking or sandwiching the MCC/PWB 16. In this regard, it should be noted that the core material (usually ferrite) will operate as a filtering medium according to its position relative to the MCC. In this manner, core material placed in the positions 18, 26, i.e., on the inside of the MCC, will filter outgoing signals; and, conversely, core material placed in the position of 20, 28 will filter incoming signals. By placing ferrite at both locations, both input and output signals are filtered. Of course, the structure shown in the Figures is meant to include embodiments using but one core material layer and in either position.

Thus, the ferrite or core material is placed on the side of the EMI filter requiring enhanced low pass filtering. The enhanced low pass filtering corresponds to the ferrite side. The course requiring HF, VHF and UHF filtering is on the same side as the ferrite. The capacitor provides low pass filtering in either direction into the micro wave region. The core material does require a low impedance environment; otherwise, the core material will not provide the desired increased series impedance between the capacitor and ground. The idea of the combined core and capacitor configuration of the invention provides a short through the connector at low frequencies (open with respect to ground). As the frequency increases, the core increases the series impedance while the capacitor decreases toward a lower impedance. The lower impedance of the capacitor connects signals to ground, while the higher impedance of the core removes the signal from the capacitor, similar to a voltage divider circuit.

Figure 5:
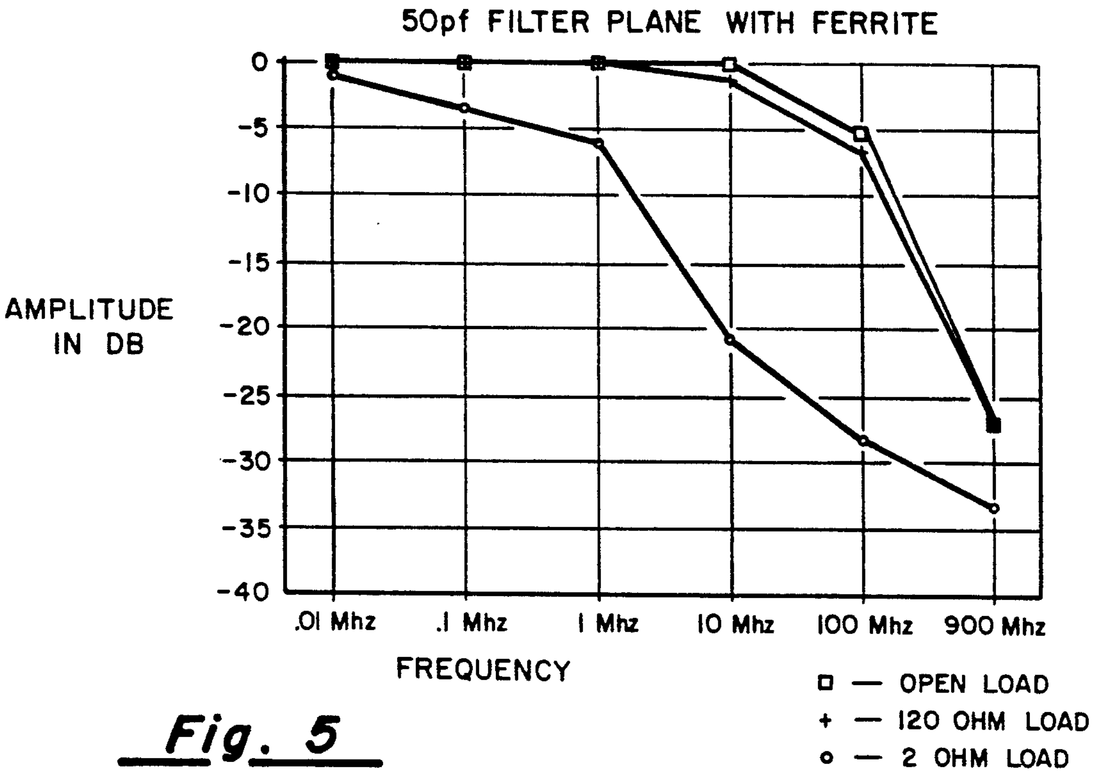
FIGS. 5 and 6 are graphical representations of the effects of 50 pf and 100 pf filter planes with ferrite at various loads over a range of RF frequencies.
Figure 6:
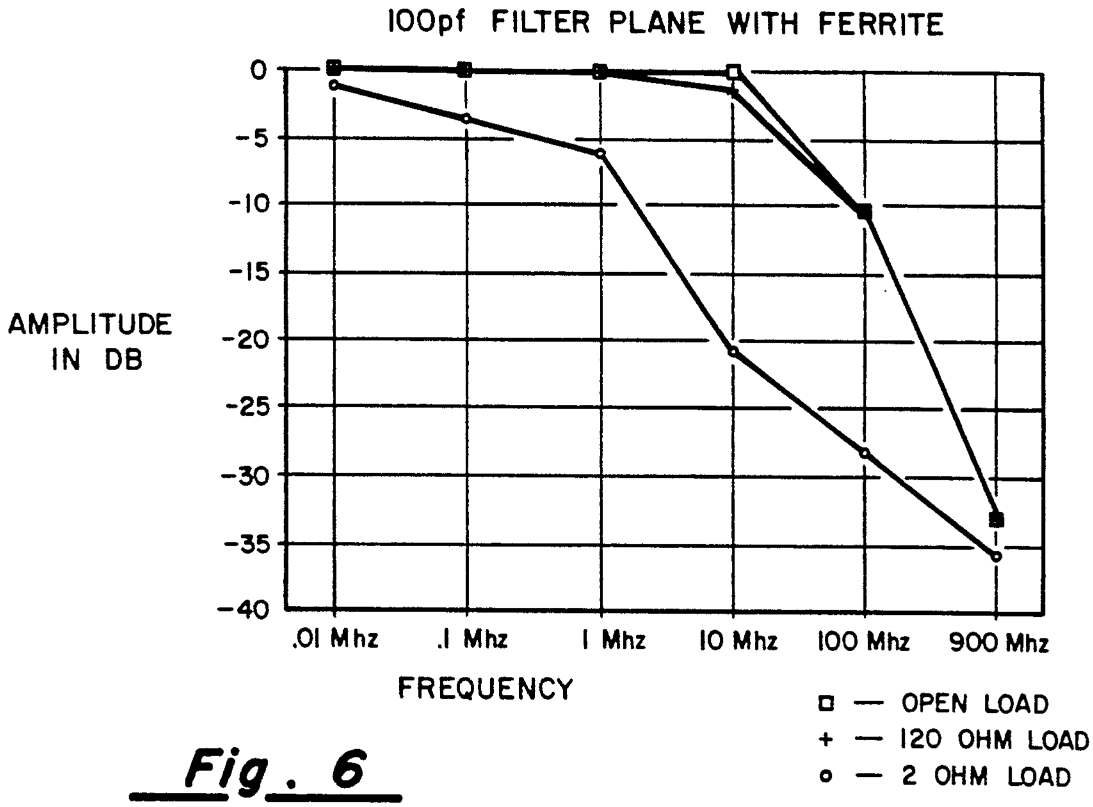
Figure 8:
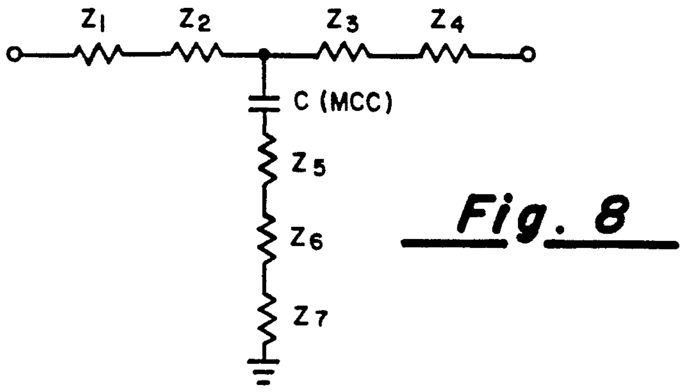
FIG. 8 is an equivalent circuit representing the combined core/capacitance system of the invention and including a ground/shield/spacer.

Typical combinations and their filtering effect with respect to an EMI range of interest are shown in FIGS. 5 and 6. The show very good suppression in the frequency range 0.01 MHz to 10 MHz at lower resistive loads and acceptable performance approaching 100 MHz for higher resistive loads. An equivalent circuit for the combined embodiments of FIGS. 1-4 is depicted in FIG. 8 in which $Z_1$ and $Z_4$ represent the impedance of the wires going to the low pass filter, $Z_2$ and $Z_3$ are the impedance of the cores (ferrite) next to the capacitor and C is the one capacitor from the multi-coplanar capacitor (MCC). $Z_5$ represents the impedance of the connection of the MCC to the ground/spacer/shield (GSS), $Z_6$ is the impedance of the GSS connection to the connector shell and $Z_7$ is the impedance of the connector shield to the chassis.

Of course, the connector pins as at 52 pass through the core material. It makes no difference for the present invention that the connector pins contact or do not contact the core (ferrite). If the core were conductive, however, the connector pins would not be allowed to contact it.

The connector pins contact the multi-coplanar capacitor through holes. The ground connection about the periphery of the capacitor should contact the connector completely as possible. The ground system will perform better with smaller gaps or apertures between the interfacing materials. (As the frequency goes up, to keep ground impedance low, the requirement for more surface area of the ground increases also.) The performance is the highest frequency at which the ground still is a low impedance to the capacitor array in the multi-coplanar capacitor, assuming that the capacitors work at the frequency of interest. The other performance is the ability to reject radio frequencies in the micro wave region and others. This requires a tight seal/connection about the ground/shield/spacer (GSS), connector shell, and multi-coplanar capacitor. When the filter assembly is used to filter signals or noise in a system. The connection between the connector and the chassis is also very important. There must be provisions for no leaking of radio frequencies (only very small apertures between inside and outside of chassis) and a low impedance ground connection for frequencies of interest. The connector shell, ground/shield/spacer, and multi-coplanar capacitor forms a barrier against specific RF going from inside to outside (or vice versa) a chassis by electrically and mechanically plugging the hole the unfiltered connector makes.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

We claim:

1. An electrical connector receptacle for allowing connection of electronic apparatus contained within a shielded enclosure to a multi-conductor wiring harness terminating in an plug of the type having a plurality of male pins arranged in a grid of rows and columns, the connector receptacle comprising:

a conductive shell defining a housing cavity having open front and rear faces, the housing cavity dimensioned to receive the plug when inserted through the open front face;

a multi-coplanar capacitor (MCC) having a front and a rear surface, the front surface facing the rear surface of the connector receptacle and removably attached thereto having a plurality of socket contacts arranged to receive the connector pins of the male plugs, having pin planes defining a multi-coplanar capacitor system and ground planes connected to a common ground conductor attached to a chassis ground;

at least one RFI filter core means disposed in front of or behind in juxtaposed relation to the MCC and having openings allowing passage of the connector terminal pins to aid in the suppression of VHF and UHF RFI;

a plurality of terminal pins joined to the socket contacts and the printed wire board; and wherein the combined structure provides a grounded RFI filter barrier, the RFI output filtering being improved with the core means located behind the MCC and the input filtering being improved with the core means disposed in front of the PWB.

2. The electrical connector of claim 1 further comprising filter core means disposed on both sides of the MCC.

3. The electrical connector of claim 1 wherein the core means comprises ferrite cores.

4. The electrical connector of claim 2 wherein the core means comprises ferrite cores.

5. An electrical connector receptacle for connecting electronic apparatus contained within a shielded enclosure to a multi-conductor wiring harness terminating in an industry standard plug connection of interest of the type having a plurality of male pins arranged in a grid of rows and columns, the connector receptacle having a conductive shell defining a housing cavity having open front and rear faces, the housing cavity dimensioned to receive the plug when inserted through the open front face, the improvement comprising an input/output RFI filtering system including in combination:

a multi-coplanar capacitor (MCC)/printed wire board (PWB) having a surface facing the rear surface of the connector receptacle and removably attached thereto having a plurality of socket contacts arranged to receive the connector pins of the male plugs, having pin planes defining a multi-coplanar capacitor system and ground planes connected to a common conductor attached to a chassis ground;

a pair of RFI filter core means disposed one in front of and one behind the PWB and having openings allowing passage of the connector terminal pins to aid in the suppression of VHF and UHF RFI;

a plurality of terminal pins joined to the socket contacts and the printed wire board; and wherein the combined structure provides a grounded RFI filter barrier, the RFI output filtering being improved with the core means located behind the PWB and the input filtering being improved with the core means disposed in front of the PWB.

6. The electrical connector of claim 5 wherein the core means comprises ferrite cores.

7. An electrical connector receptacle for allowing connection of electronic apparatus contained within a shielded enclosure to a multi-conductor wiring harness terminating in an plug of the type having a plurality of male pins arranged in a grid of rows and columns, the connector receptacle comprising:

a conductive shell defining a housing cavity having open front and rear faces, the housing cavity dimensioned to receive the plug when inserted through the open front face;

a printed wire board (PWB) having a surface facing the rear surface of the connector receptacle and removably attached thereto having a plurality of socket contacts arranged to receive the connector pins of the male plugs, having pin planes defining a multi-coplanar capacitor system and ground planes connected to a common ground conductor attached to a chassis ground;

at least one RFI filter core means disposed in front of or behind the PWB and having openings allowing passage of the connector terminal pins to aid in the suppression of VHF and UHF RFI;

a plurality of terminal pins joined to the socket contacts and the printed wire board;

wherein the combined structure provides a grounded RFI filter barrier, the RFI output filtering being improved with the core means located behind the PWB and the input filtering being improved with the core means disposed in front of the PWB; and a ground EMI/RFI shield spacer means in the form of an open faced frame member having a conductive surface removably attached to the shell proximate the open rear face of the shell and having substantially parallel opposed major peripheral surfaces containing cutouts arranged to include the grid areas of the pattern of rows and columns and core means in the cutouts surrounding each of the connector terminal pins to aid in suppression of RFI.

8. The electrical connector of claim 7 wherein the core means comprises ferrite cores.

* * * * *